(12) United States Patent
Baergen et al.

(10) Patent No.: US 10,154,090 B1
(45) Date of Patent: Dec. 11, 2018

(54) DISTRIBUTED CACHE COHERENCY PROTOCOL FOR REDUCED LATENCY ACROSS WAN LINKS

(71) Applicant: EMC Corporation, Hopkinton, MA (US)

(72) Inventors: Joshua Baergen, Edmonton (CA); Brian Lake, Edmonton (CA); Steven Bromling, Edmonton (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 404 days.

(21) Appl. No.: 14/860,853

(22) Filed: Sep. 22, 2015

(51) Int. Cl.
  *G06F 15/16* (2006.01)
  *H04L 29/08* (2006.01)
  *G06F 12/0802* (2016.01)

(52) U.S. Cl.
  CPC ...... *H04L 67/1097* (2013.01); *G06F 12/0802* (2013.01); *H04L 67/2842* (2013.01); *G06F 2212/154* (2013.01)

(58) Field of Classification Search
  USPC ........................................ 709/213, 217, 219
  See application file for complete search history.

(56) References Cited

U.S. PATENT DOCUMENTS

| | | | |
|---|---|---|---|
| 8,156,163 B1* | 4/2012 | Hamilton | H04L 67/1097 707/812 |
| 2009/0210431 A1* | 8/2009 | Marinkovic | G06F 17/302 |
| 2011/0145307 A1* | 6/2011 | Ananthanarayanan | G06F 17/30132 707/827 |
| 2016/0140003 A1* | 5/2016 | Panara | G06F 11/2017 714/6.21 |

* cited by examiner

*Primary Examiner* — Joseph E Avellino
*Assistant Examiner* — Marshall M McLeod
(74) *Attorney, Agent, or Firm* — Anderson Gorecki LLP (57) ABSTRACT

A share group for a distributed volume is separated into two non-overlapping, cluster-local SGCs (share group cliques). Each SGC has an independent local meta-directory master hosted by a computing node of the SGC cluster. Each SGC maintains an independent local directory for the distributed volume. The directory may be spread across multiple computing nodes of the SGC cluster. Changes to the distributed volume (writes) are coordinated across the pair of SGCs to provide data consistency. The coordination of these changes is conducted using relatively few inter-SGC round-trips. Read access to the distributed volume is safely conducted without inter-SGC coordination.

20 Claims, 9 Drawing Sheets

DISTRIBUTED CACHE COHERENCY PROTOCOL FOR REDUCED LATENCY ACROSS WAN LINKS

BACKGROUND

Aspects of this disclosure are generally related to distributed data storage systems which can be used to maintain relatively large data sets and support a relatively large number of concurrent users. The basic building blocks of a distributed data storage system may include computing nodes such as storage engines or storage servers. The computing nodes provide access to data storage devices such as disk drives and flash drives. A plurality of computing nodes can be interconnected in order to function together as a cluster. A plurality of clusters can be interconnected by communication links to enable the clusters to function as a single distributed storage system.

SUMMARY

All examples, aspects and features mentioned in this document can be combined in any technically possible way.

In accordance with an aspect, an apparatus comprises: a first cluster comprising: a first set of non-volatile back-end storage devices; a plurality of first computing nodes which present a logical storage device and manage access to the first set of non-volatile back-end storage devices; and a first local directory associated with the logical storage device, the first local directory indicating locations of data stored in cache of the first computing nodes; wherein the first cluster is configured to operate as part of a storage system comprising a second cluster comprising a plurality of second computing nodes which present the logical storage device and manage access to a second set of non-volatile back-end storage devices, and a second local directory associated with the logical storage device, the second local directory indicating locations of data stored in cache of the second computing nodes. In some implementations the first local directory is hosted by one of the first computing nodes. In some implementations the first local directory is distributed across multiple ones of the first computing nodes. In some implementations a first local meta-directory is hosted by one of the first computing nodes, the first local meta-directory indicating which local directory is associated with each extent of data of the logical storage device.

In accordance with another aspect a data storage system comprises: a first cluster comprising a plurality of first computing nodes which present a logical storage device and manage access to a first set of non-volatile back-end storage devices, and a first local directory associated with the logical storage device, the first local directory indicating locations of data stored in cache of the first computing nodes; and a second cluster comprising a plurality of second computing nodes which present the logical storage device and manage access to a second set of non-volatile back-end storage devices, and a second local directory associated with the logical storage device, the second local directory indicating locations of data stored in cache of the second computing nodes; wherein the first cluster is in communication with the second cluster via a network. In some implementations the first local directory is hosted by one of the first computing nodes and the second local directory is hosted by one of the second computing nodes. In some implementations the first local directory is distributed across multiple ones of the first computing nodes and the second local directory is distributed across multiple ones of the second computing nodes. In some implementations a first local meta-directory is hosted by one of the first computing nodes and a second local meta-directory hosted by one of the second computing nodes, the first and second local meta-directories indicating which of the first and second computing nodes, respectively, host portions of the local directory associated with each extent of data of the logical storage device. In some implementations, in response to a read request, a receiving computing node of the plurality of first computing nodes is configured to prompt the computing node which hosts the first local meta-directory to identify at least one of the computing nodes that hosts the first local directory for data associated with the read request. In some implementations the receiving computing node obtains a location of the data from the at least one of the computing nodes that hosts the first local directory for data associated with the read request, and uses that location to obtain a copy of the data. In some implementations, in response to a write request, a receiving computing node of the plurality of first computing nodes is configured to prompt the computing node which hosts the first local meta-directory to contact at least one of the computing nodes that hosts the first local directory for data associated with the write request to obtain locks and maintain cache coherency. In some implementations the computing node which hosts the first local meta-directory contacts the computing node which hosts the second local meta-directory to prompt the computing node which hosts the second local meta-directory to contact at least one of the computing nodes that hosts the second local directory for data associated with the write request to obtain locks and maintain cache coherency. In some implementations, in response to an overlapping write request, the computing node which hosts the first local meta-directory and the computing node which hosts the second local meta-directory independently determine priority of the write request relative to the overlapping write request and execute the write requests in order as determined by priority. In some implementations a lock obtained for a lower priority write is released to an overlapping higher priority write.

In accordance with an aspect a method comprises: in a first cluster comprising a plurality of first computing nodes: presenting a logical storage device backed by a first set of non-volatile back-end storage devices; maintaining a first local directory associated with the logical storage device, the first local directory being distributed across multiple ones of the first computing nodes and indicating locations of data stored in cache of the first computing nodes; and maintaining a first local meta-directory hosted by one of the first computing nodes, the first local meta-directory indicating which first computing nodes host portions of the local directory associated with each extent of data of the logical storage device; and in a second cluster comprising a plurality of second computing nodes: presenting the logical storage device backed by a second set of non-volatile back-end storage devices; maintaining a second local directory associated with the logical storage device, the second local directory being distributed across multiple ones of the second computing nodes and indicating locations of data stored in cache of the second computing nodes; and maintaining a second local meta-directory hosted by one of the second computing nodes, the second local meta-directory indicating which second computing nodes host portions of the local directory associated with each extent of data of the logical storage device. In some implementations, in response to a read request, a receiving computing node of the plurality of first computing nodes prompting the computing node which hosts the first local meta-directory to identify at least one of the computing nodes that hosts the first local directory for data associated with the read request. Some implementations comprise the receiving computing node obtaining a location of the data from the at least one of the computing nodes that hosts the first local directory for data associated with the read request, and using that location to obtain a copy of the data. Some implementations comprise, in response to a write request, a receiving computing node of the plurality of first computing nodes prompting the computing node which hosts the first local meta-directory to contact at least one of the computing nodes that hosts the first local directory for data associated with the write request to obtain locks and maintain cache coherency. Some implementations comprise the computing node which hosts the first local meta-directory contacting the computing node which hosts the second local meta-directory to prompt the computing node which hosts the second local meta-directory to contact at least one of the computing nodes that hosts the second local directory for data associated with the write request to obtain locks and maintain cache coherency. Some implementations comprise, in response to an overlapping write request, the computing node which hosts the first local meta-directory and the computing node which hosts the second local meta-directory independently determining priority of the write request relative to the overlapping write request and executing the write requests in order as determined by priority.

DETAILED DESCRIPTION

Figure 1:
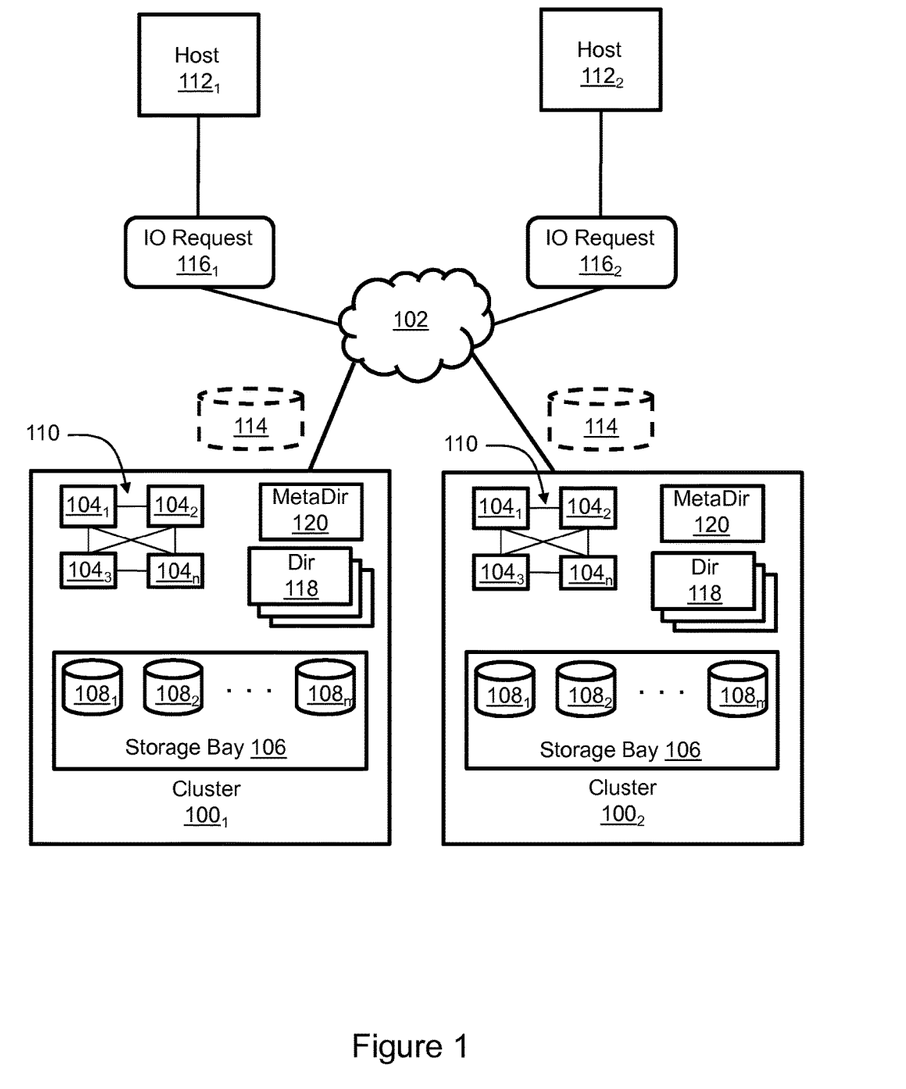
FIG. 1 illustrates a distributed data storage system with local directories and meta-directories.

FIG. 1 illustrates a distributed data storage system that maintains data and supports IOs associated with a large number of concurrent users. The data storage system includes storage clusters $100_1$, $100_2$ that are interconnected via a network 102. For context and without limitation the network 102 could be a WAN (wide area network) or MAN (metropolitan area network) and each cluster could be in one or more racks or chassis. Each storage cluster $100_1$, $100_2$ includes one or more computing nodes such as storage engines $104_1$-$104_n$ or storage servers, and a storage bay 106 with multiple data storage devices $108_1$-$108_m$. The storage devices $108_1$-$108_m$ may include pools of different types of non-volatile data storage devices which are organized into hierarchical tiers. For example and without limitation, the data storage devices may include a storage pool of flash drives at tier 0, a storage pool of FC (Fibre Channel) drives at tier 1, and a storage pool of SATA (serial advanced technology attachment) drives at tier 2. Each storage engine is connected to every other storage engine via point-to-point links of an interconnecting fabric 110. Moreover, each printed circuit board "blade" in the cluster may be interconnected via the fabric 110. The point-to-point links provide high speed communications and support operations such as RDMA (Remote Direct Memory Access).

The data storage system presents a logical storage device 114 to associated host devices 1121, 1122. One or more logical storage devices may be created for each hosted application, although a system admin might create the logical storage devices for any of a variety of purposes. The logical storage devices, which may be referred to as or by LUNs (logical unit numbers), virtual volumes, or meta-volumes, may be presented to the host devices as a set of contiguous address locations. For purposes of explanation the logical storage device 114 may be referred to hereafter as a DR1 (distributed RAID 1 virtual volume) because mirrored copies of the data associated with the logical storage device 114 are maintained in the data storage devices $108_1$-$108_m$ of each cluster.

Figure 2:
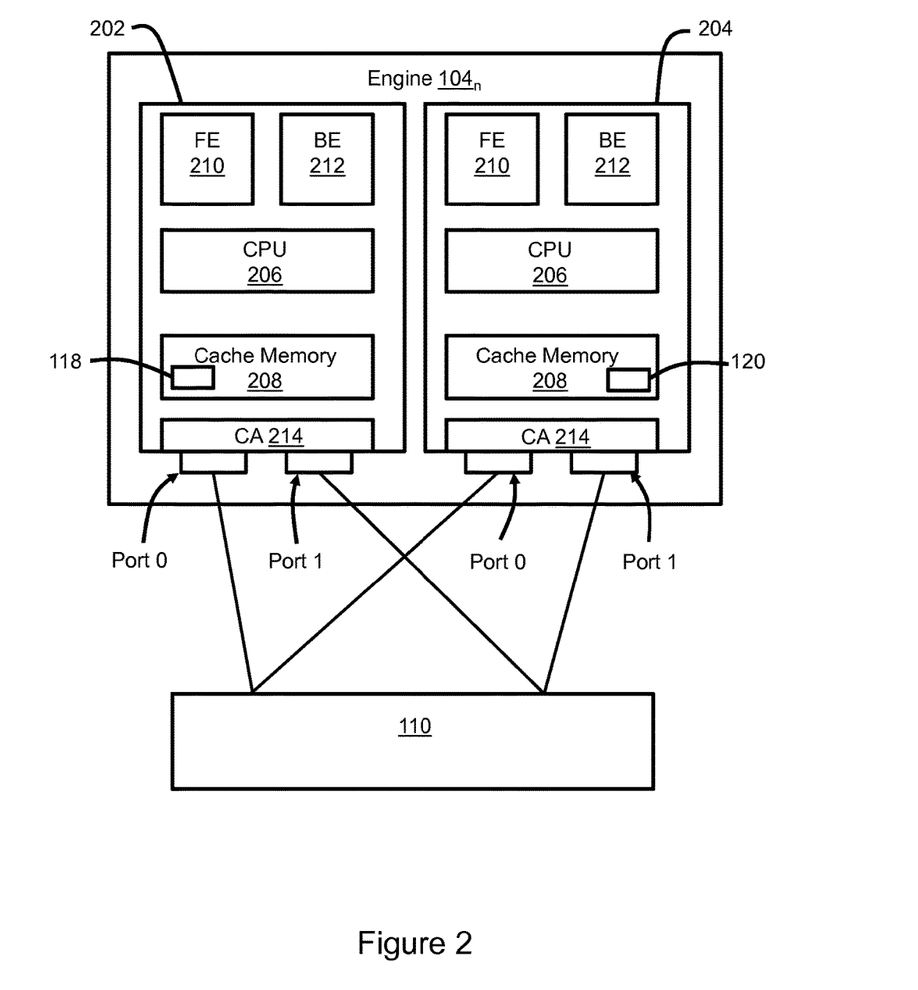
FIG. 2 illustrates a storage engine of the data storage system in greater detail.

FIG. 2 illustrates an implementation of a storage engine $104_n$ (FIG. 1) in greater detail. In the illustrated example the storage engine includes two storage directors 202, 204. Each storage director includes a multi-core CPU 206, a cache memory 208, a front end module 210, and back end module 212, and a channel adapter 214, all of which may be on a single printed circuit board blade. The front end module 210 is configured to interface with the host devices 1121, 1122 (FIG. 1). For example, the front end module presents the logical storage device, receives IO requests from host application instances, and provides data in response to read requests. The back end module 212 interfaces with the back end physical storage devices $108_1$-$108_m$ (FIG. 1). For example, the back end module reads data from and writes data to the back end storage devices. The CPU 206 runs a variety of programs configured to cause the director to perform IOs and other functions. Each channel adapter 214 includes two ports, Port 0 and Port 1. The two ports correspond to two switches of the fabric 110 which provides redundant point-to-point connectivity between directors. The cache memory 208, which may include volatile memory components such as RAM (random access memory) chips for example and without limitation, includes a section which is allocated for temporarily storing data that is being written to or read from the back end storage devices. For example, data that is being written by a host device is initially copied to the cache 208 and subsequently destaged to the back end storage devices. Data that is being read by a host device is copied from the back end storage devices to cache 208 via the back-end module and then provided to the host. Data may be also copied to the cache from the back end storage devices in response to a hint.

Referring to FIGS. 1 and 2, a device such as a user terminal or server uses the data storage system by communicating with one of the host devices 1121, 1122 associated with the data storage system, e.g., via the network 102. Multiple host devices may be associated with each cluster, and each host device may host any of a wide variety of applications. An exemplary host device may be a type of server which hosts one or more instances of an application such as a database, for example and without limitation, for which the corresponding data is maintained by the data storage system. A communication between the computing device and an instance of an application running on one of the host devices 1121, 1122 may prompt a corresponding IO request 1161, 1162 respectively to be sent to cluster 1001, 1002 respectively by the application instance in order to read or write data. Any of the storage directors 202, 204 of the storage engines 1041-104n can receive and process IO requests, e.g., by writing data to the physical storage devices or reading data from the physical storage devices and sending the data to the host. When data corresponding to an IO request is already in the cache, i.e., a "cache hit," then that cached copy of the data can be used to service the IO request without accessing back end storage. When the data being accessed is not already in the cache, i.e. a "cache miss," then that data must be copied into the cache in order to service the IO request, e.g., copied into cache from back end storage in response to a read request. Generally, any data that has not been accessed recently or within a predetermined period of time may be flushed from the cache and written to the back end storage devices. The storage directors 202, 204 may operate in parallel such that IO requests are concurrently serviced and the failure of one director does not cause the failure of other directors.

The application and the host device will typically be unaware of the actual location of data on the physical storage devices 1081-108m. The IO requests 1161, 1162 reference one or more locations in the logical storage device 114. The data stored on each logical storage device may be distributed across multiple physical storage devices 1081-108m, and extents of data may be moved between physical storage devices in response to tiering decisions and other factors. Each cluster maintains mappings between the logical storage device 114, cache memory, and the physical storage devices 1081-108m. The mapping for logical device 114 is maintained in a local directory 118, which indicates which pages are in cache and where pages are located in backend storage. There may be multiple logical devices and local directories, e.g., one local directory corresponding to each logical storage device presented by the storage system. Each local directory may be hosted by one or more directors, e.g., distributed across multiple directors. Each of the storage directors to which a portion of the local directory is distributed tracks data currently in the caches of the local storage directors associated with a given storage device for an assigned range of potential cache pages corresponding to a range of back-end LBAs. (logical block addresses). The hosting relationships may be changed such that the same directory or portion thereof is owned by a different storage engine at different points in time. A local meta-directory 120 is maintained by one of the directors to track current directory ownership. For example, the meta-directory can be used to determine which director currently owns the portion of a directory needed to access a page or extent of data associated with an IO request.

The section of the cache 208 of each director that is used to temporarily store selected data as described above is shared globally within the cluster with which the director is associated. More particularly, any director in the cluster can write to and read from the cache of the other directors in the data storage system via RDMA. Consequently, if a director associated with storage engine 1041 receives a request to access data that is in the cache of a director associated with storage engine 1043 it is considered as a cache hit. The director associated with storage engine 1041 accesses the data from the cache of the director associated with storage engine 1043 via RDMA such that a copy of the data is stored in the cache of the director associated with storage engine 1041. The director associated with storage engine 1041 then provides the data to the host via the front end module or writes to back end storage. While it is generally less time consuming to access data from cache than from back end storage it may be faster to access data from local back end storage than from a cache in a remote cluster.

As will be explained in greater detail below, a share group for a DR1 (distributed RAID 1 volume) is separated into two non-overlapping, cluster-local SGCs (share group cliques). The two SGCs operate independently. Each SGC assigns its own ranks (each cluster will have rank-0 through rank-(participatingDirectorsInCluster−1)). Each SGC has an independent local meta-directory master. Each SGC maintains an independent local directory for the associated virtual volume. The directory may be spread across directors at the local SGC cluster. The use of corresponding local directories and meta-directories at each cluster can reduce inter-cluster communications across the network 102 in comparison with examples where there is one directory master per logical device and one meta-directory master for the entire storage system. For example, reads may be processed entirely in the scope of the local SGC, and writes may be coordinated across both SGCs using a Metro-Write protocol. Even if the number of inter-cluster communications is not reduced in every possible scenario, the use of corresponding local directories and meta-directories at each cluster can result in more predictable latency because, for example, the number of inter-cluster communications required may be more predictable.

Figure 3:
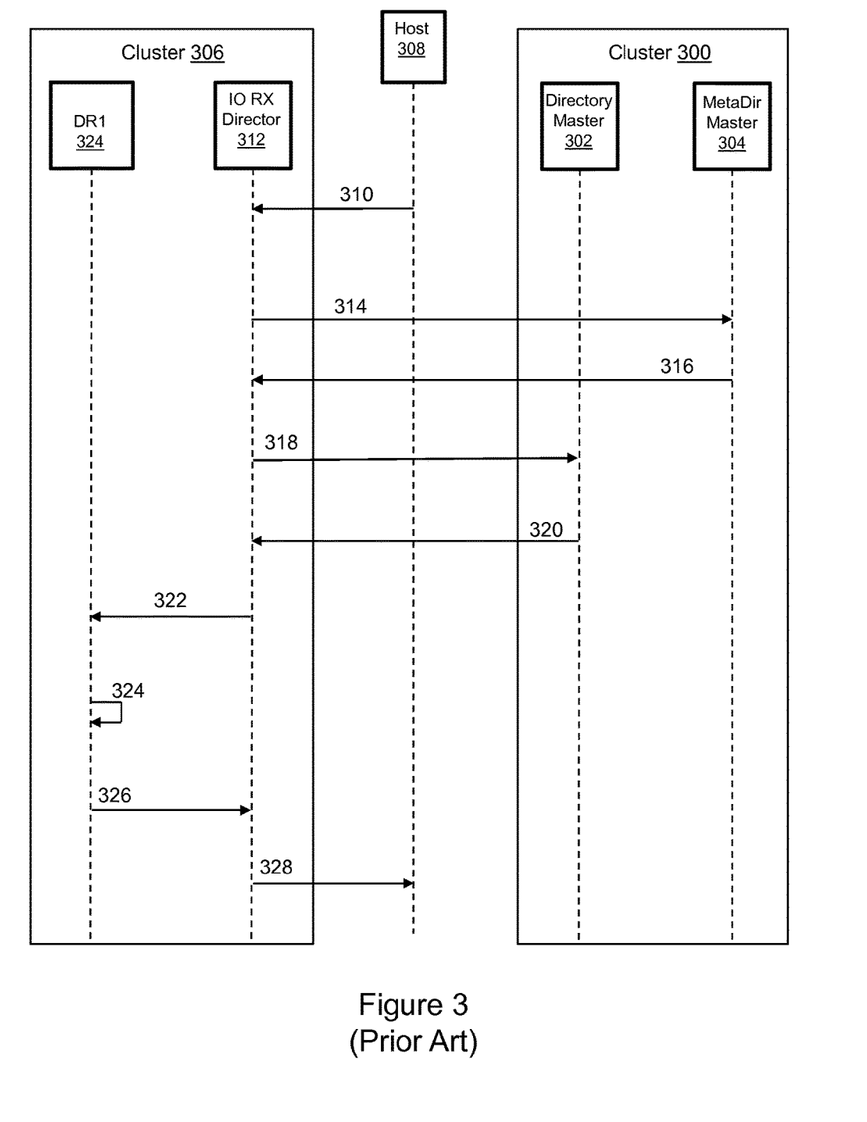
FIG. 3 illustrates a read IO in an example where a meta-directory master and directory master are in a different cluster than the IO receiving director.

FIG. 3 illustrates a read IO in an example where a meta-directory master and directory master are both in a different cluster than the IO receiving director. Cluster 300 includes different directors which currently serve as a directory master owner 302 and a meta-directory master owner 304, respectively, for a storage system that includes cluster 300 and cluster 306. A host 308 sends a read IO request 310 to cluster 306. The request is received by an IO receiving director 312, which could be any director in cluster 306. IO receiving director 312 responds to the request 310 by sending an inter-cluster query 314 to the meta-directory master owner 304. The meta-directory master owner 304 responds by sending an inter-cluster reply 316 which identifies a directory master owner 302 which is the current owner of the portion of the directory corresponding to the data associated with the read request. The IO receiving director 312 uses that information to direct an inter-cluster message 318 to the directory master owner 302. The directory master owner responds by sending an inter-cluster reply 320 with the metadata required to find the data. The IO receiving director 312 uses the metadata to generate a read message 322 which is sent to the local DR1 324. The message 322 prompts the data to be copied from back end storage to local memory at 324, and a read done message 326 is sent to the IO receiving director 312. The IO receiving director then provides the data 328 to the host 308.

Figure 4:
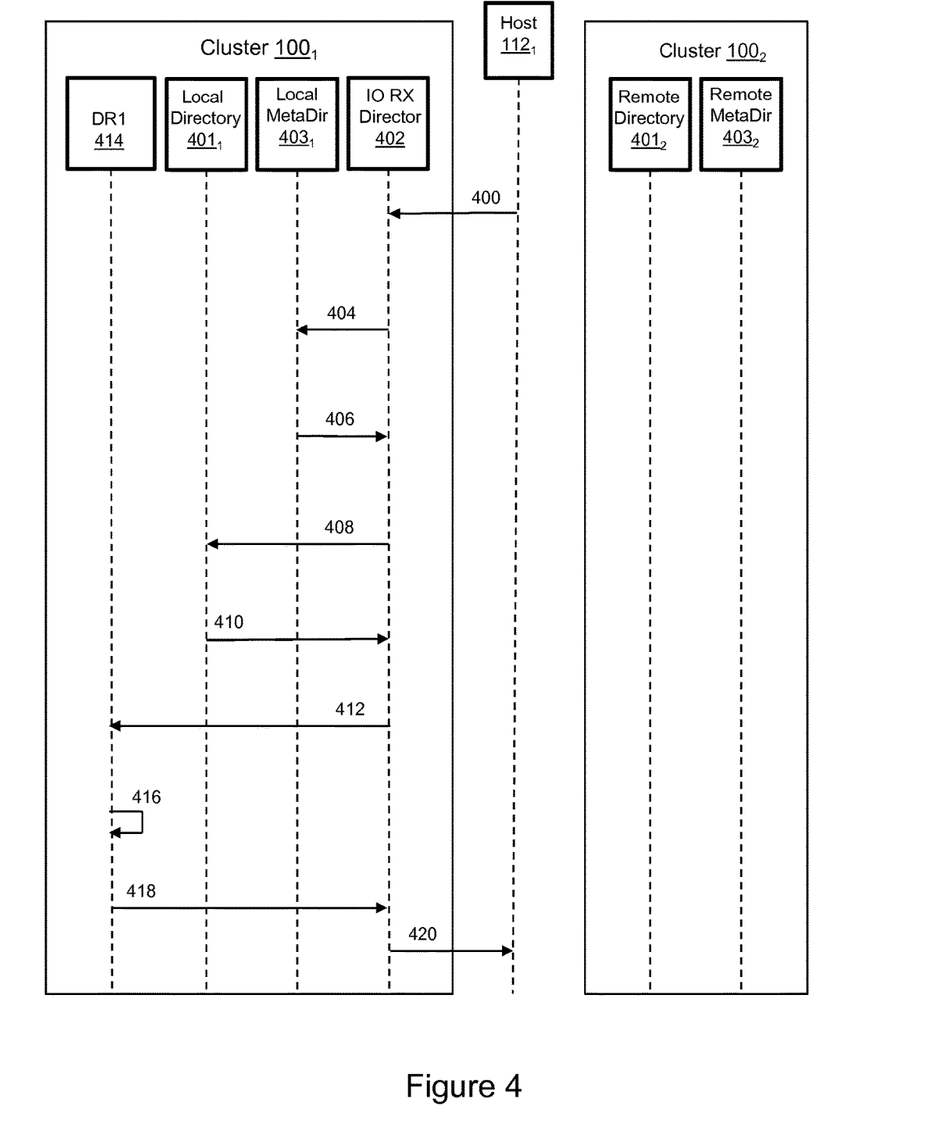
FIG. 4 illustrates a read IO in an example where each cluster maintains a local meta-directory and a local directory.

FIG. 4 illustrates a read IO in an example where each cluster maintains a local meta-directory and a local directory, e.g., and without limitation, as in FIGS. 1-2. Host 1121 sends a read IO request 400 to cluster 1001. The IO request 400 is received by an IO receiving director 402, which could be any director in cluster 1001. For purposes of explanation the IO receiving director 402, local meta-directory owning director 4031 and local directory owning director 4011 are assumed to be different directors, although this may not always be true in practice. A cache miss is also assumed for purposes of explanation. IO receiving director 402 responds to the read IO request 400 by sending a query 404 to the local meta-directory owner 4031. The local meta-directory owner 4031 responds by sending a reply 406 which identifies the local director which is the current owner of the portion of the local directory corresponding to the data associated with the read request 400, i.e., local directory owner 4011. The IO receiving director 402 uses that information to direct a message 408 to the local directory owner 4011, which provides a reply 410 with a mapping for the data, e.g. an identity of the director that is currently responsible for maintaining the pages in cache and metadata that indicates where the data is located in back end storage. The IO receiving director 402 uses the mapping information to generate a read message 412 which is sent to the DR1 414. The message 412 prompts the data to be copied from back end storage to local memory at 416, and a read done message 418 is sent to the IO receiving director 402. The IO receiving director then provides the data 420 to the host 1121. A remote directory owner 4012 and remote meta-directory owner 4032 in cluster 1002 are not involved in the read operation.

Comparing FIG. 3 with FIG. 4 it is apparent that there are zero inter-cluster communications required for the read IO where each cluster maintains a local meta-directory and a local directory, whereas there are four inter-cluster communications 314, 316, 318, 320 for the read IO where a single meta-directory master and a single directory master exist for the entire storage system. An inter-cluster communication tends to require greater time to accomplish than an intra-cluster communication. Consequently, the use of local directories and local meta-directories tends to reduce latency. Fewer inter-cluster communications might be required if the directory master and meta-directory master owning directors are in the same cluster as the IO receiving director, but the prior art design exhibits variable latency depending on the locations of those masters in relation to the IO receiving director, whereas the use of local directories and local meta-directories tends to provide more predictable latency.

Figure 5:
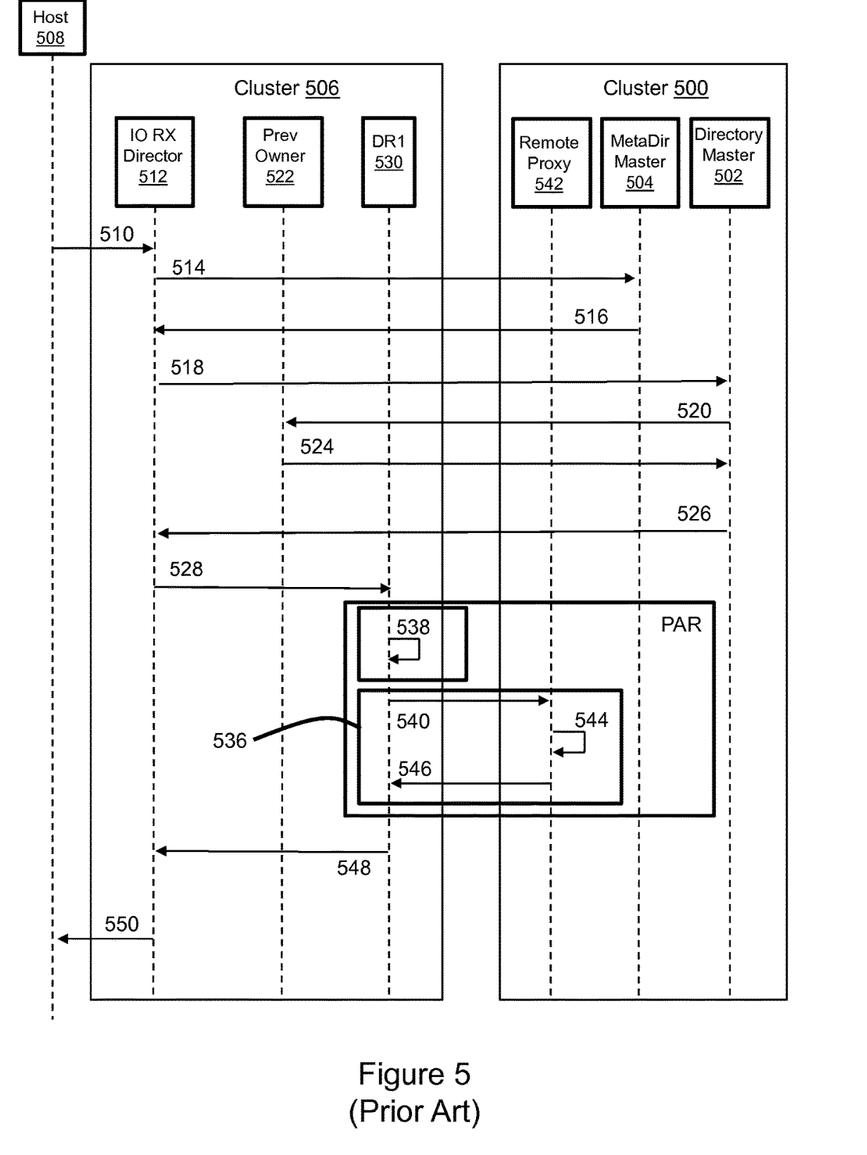
FIG. 5 illustrates a write IO in the absence of cross-site overlap and in an example where a meta-directory master and directory master are in a different cluster than the IO receiving director.

FIG. 5 illustrates a write IO in the absence of cross-site overlap where a meta-directory master and directory master are in a different cluster than the IO receiving director. Cluster 500 includes different directors which currently own a directory master 502 and a meta-directory master 504, respectively, for a storage system that includes cluster 500 and cluster 506. A host 508 sends a write IO request 510 to cluster 506. The request, which includes data to be written, is received by an IO receiving director 512, which could be any director in cluster 506. IO receiving director 512 responds to the request by sending an inter-cluster query 514 to the meta-directory master owner 504. The meta-directory master owner 504 responds by sending an inter-cluster reply 516 which identifies the director which is the current owner of the portion of the directory corresponding to the data associated with the write request 510, i.e., directory master owner 502. The IO receiving director 512 uses that information to direct an inter-cluster message 518 to the directory master owner 502. The directory master owner responds by sending an inter-cluster invalidation message 520 to a previous owner director 522. The invalidation message prompts the previous owner director to delete corresponding older data from cache. This is done because the data currently in cache will be made outdated by the write operation. The previous owner 522 responds with an inter-cluster invalidation reply 524. The directory master owner 502 then provides an inter-cluster reply 526 with a mapping for the data. The IO receiving director 512 uses the mapping information to generate a write message 528 which is sent with data to the DR1 530. The message 528 prompts a write to local 538 at DR1 530 in cluster 506. A set 536 of procedures occur in parallel with write message 538. The set 536 of procedures includes an inter-cluster remote write message (with data) 540 to remote proxy 542, a write to remote 544, and an inter-cluster remote write reply 546. When the parallel procedures are completed a write done message 548 is sent to the IO receiving director 512. A write acknowledgement message 550 is then sent from the IO receiving director 512 to the host 508.

Figure 6:
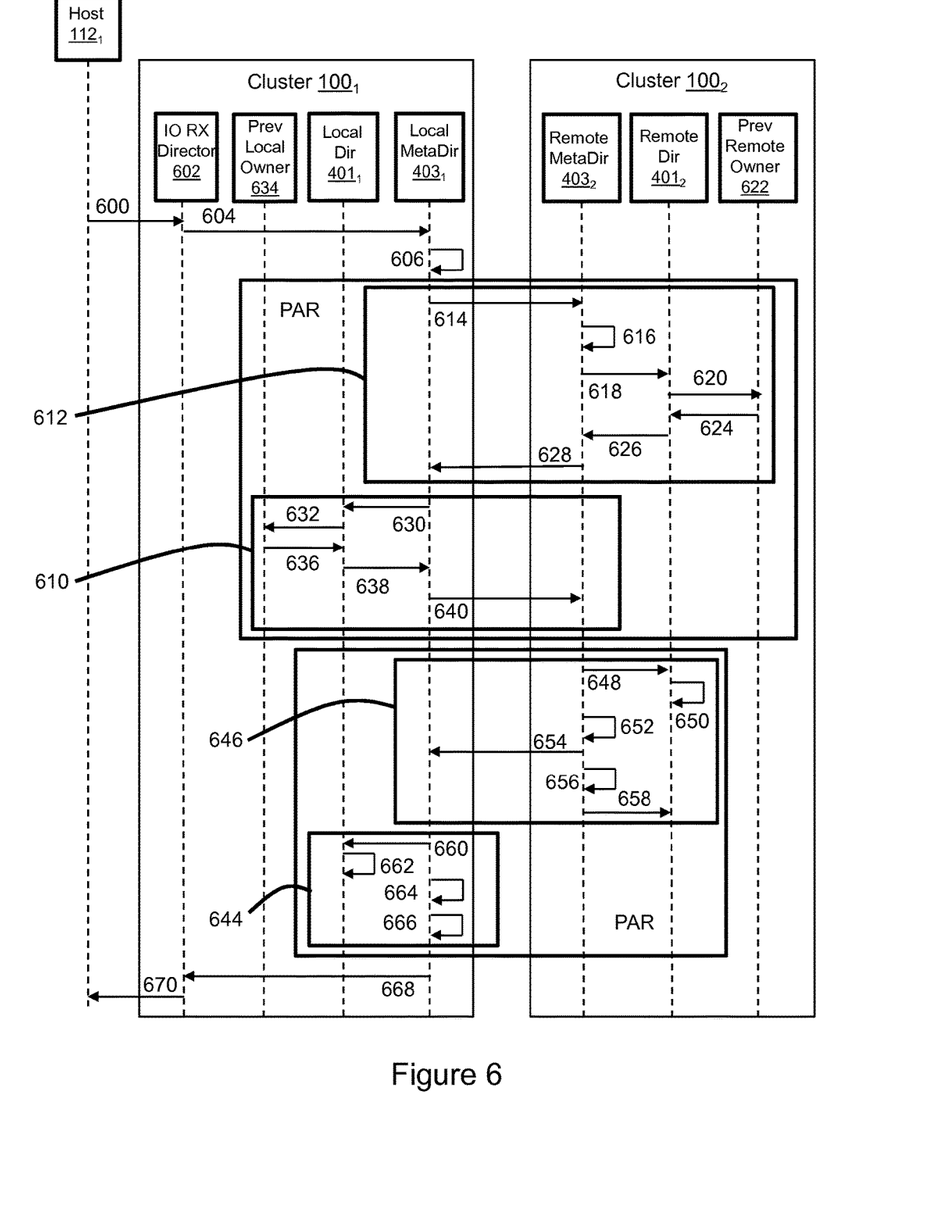
FIG. 6 illustrates a write IO the absence of cross-site overlap and in an example where each cluster maintains a local meta-directory and a local directory.

FIG. 6 illustrates a write IO in the absence of cross-site overlap where each cluster maintains a local meta-directory and a local directory, e.g., and without limitation, as in FIGS. 1-2. Host 1121 sends a write IO request 600 (with data) to cluster 1001. The IO request 600 is received by an IO receiving director 602, which could be any director in cluster 1001. For purposes of explanation the IO receiving director 602, local meta-directory owning director 4031 and local directory owning director 4011 are assumed to be different directors, although this may not always be true in practice. Further, remote meta-directory owning director 4032 and remote directory owning director 4012 are assumed to be different directors, although this may not always be true in practice. IO receiving director 602 responds to the write IO request 600 by sending a write local message (with data) 604 to the local meta-directory owner 4031. The message 604 is an indication of an intent to write to the cache of the appropriate directory owners associated with the data, i.e., the directors responsible for maintaining cache coherence. The local meta-directory owner 4031 responds by imposing ordering for local overlaps, if any, at 606. In other words, if multiple local IOs overlap then those IOs are ordered in accordance with a prioritization technique. A wide variety of prioritization techniques for ordering of IOs could be implemented. For purposes of explanation it is assumed that there are no local overlaps and thus no local IO ordering operations.

The local meta-directory owner 4031 prompts parallel sets 610, 612 of procedures. The parallel procedures can be executed simultaneously. Procedure set 612 includes a remote write message (with data) 614 that is sent from the local meta-directory owner to the remote meta-directory owner 4032 in cluster 1002. The remote meta-directory owner 4032 responds by imposing ordering for remote overlaps, if any, at 616. For purposes of explanation it is assumed that there are no remote overlaps and thus no remote ordering of IO operations. The remote meta-directory owner 4032 then sends a speculative lock and invalidation message 618 to the director which owns the portion of the remote directory corresponding to the data, i.e., remote directory owner 4012. The remote directory owner provides the locks and sends an invalidation message 620 to a previous owner director 622. The invalidation message 620 prompts the previous owner director 622 to delete corresponding data from cache. This is done because the corresponding data in cache will be made outdated by the write operation. The previous owner director 622 responds with an invalidation reply 624 indicating that the stale data has been cleared from cache. The remote directory owner then sends a speculative lock and invalidation ready message 626 to the remote meta-directory owner 4032. The remote meta-directory owner then sends an invalidation done message 628 to the local meta-directory owner 4031 in cluster 1001. The local procedures 610 include a speculative lock and invalidation message 630 which is sent from the local meta-directory owner 4031 to the local directory owner 4011. The local directory owner provides the locks and sends an invalidation message 632 to a previous local owner director 634. The invalidation message 632 prompts the previous local owner director to delete corresponding data from cache. The previous local owner 634 responds with an invalidation reply 636. The local directory owner 4011 then sends a speculative lock and invalidation ready message 638 to the local meta-directory owner 4031. The local meta-directory owner then sends an invalidation done message 640 to the remote meta-directory owner 4032 in cluster 1002.

The invalidation done message 640 prompts second parallel sets 644, 646 of procedures. Set 646 includes the remote meta-directory owner 1022 sending a speculative lock and invalidation done message 648 to the remote directory owner 4012. The remote meta-directory owner prompts a SCSI write 652 to the remote cluster DR1 and sends a metro write done message 654 to the local meta-directory owner. At some point the remote directory owner unlocks the data locations at 650. A discard data action 656 and eviction notice 658 may optionally be implemented, e.g., to prepare for a change of directory ownership. Set 644 includes a speculative lock and invalidation done message 660 which is sent from the local meta-directory owner 4031 to the local directory owner 4011. A SCSI write 664 to the local cluster DR1 is then executed. At some point the local directory owner unlocks the data locations at 662, and a discard data action 666 is executed.

Upon completion of the parallel procedures a write done message 668 is sent from the local meta-directory owner to the IO receiving director. The IO receiving director then sends a write acknowledgement message 670 to the host.

Comparing FIG. 5 with FIG. 6 it can be seen that cross-site communications are reduced where each cluster maintains a local meta-directory and a local directory. For example, cross-site meta-directory query and reply messages can be avoided, and invalidation and reply messages can be handled more locally. Latency may also be reduced by increased parallelism of procedures.

Figure 7:
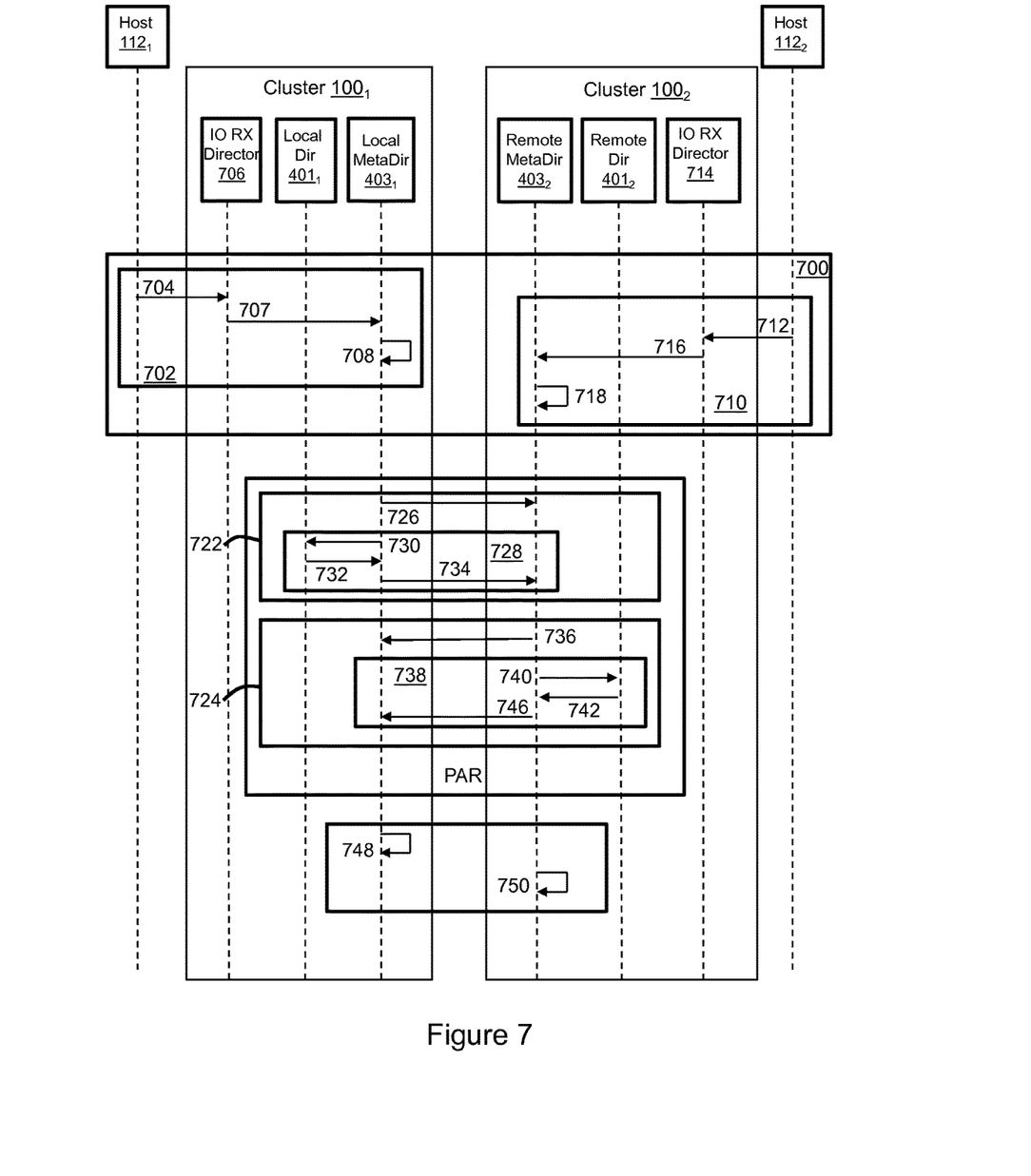
FIGS. 7 through 9 illustrate a write IO in the presence of cross-site overlap and in an example where each cluster maintains a local meta-directory and a local directory.
Figure 8:
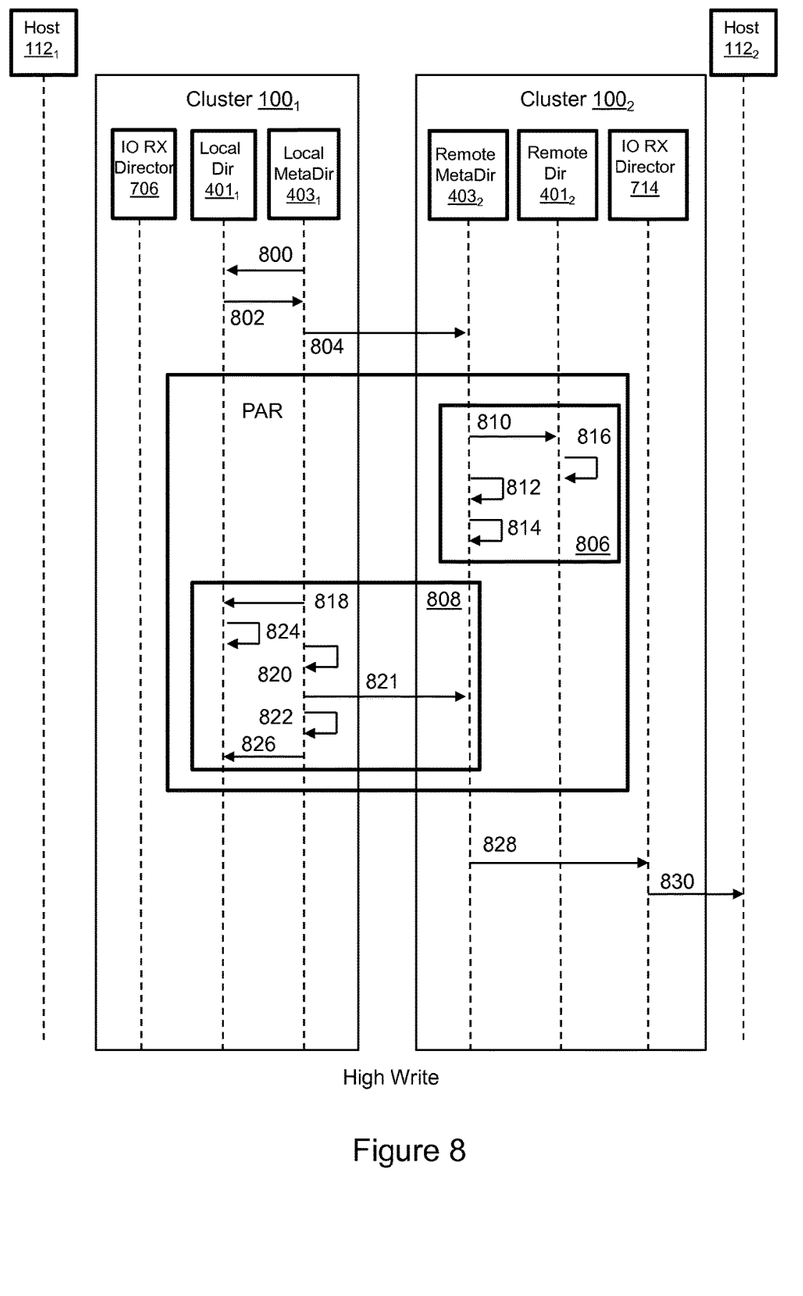
Figure 9:
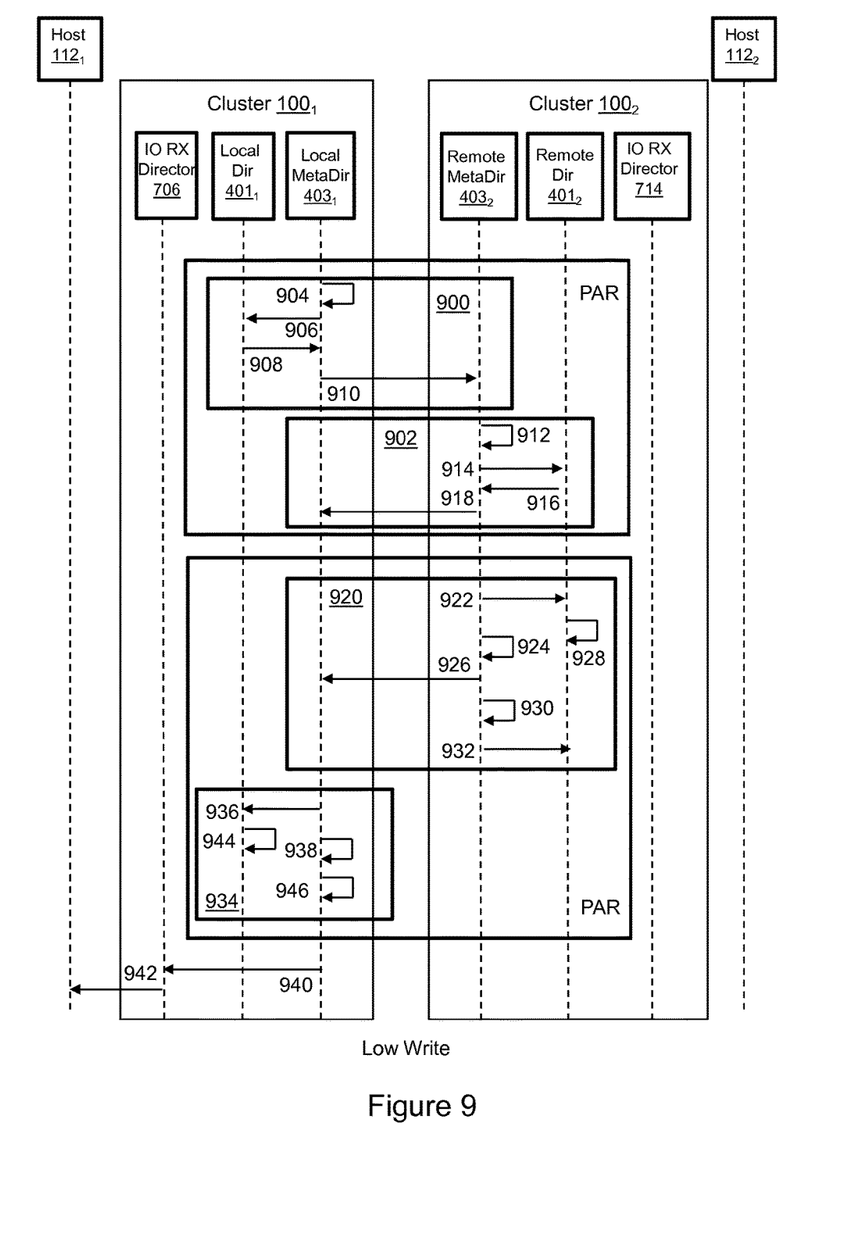

FIGS. 7 through 9 illustrate a write IO in the presence of cross-site overlap 700 where each cluster maintains a local meta-directory and a local directory, e.g., and without limitation, as in FIGS. 1-2. Referring specifically to FIG. 7, in what will be determined to be a low priority write 702, host 1121 sends a write IO request 704 (with data) to cluster 1001. The IO request 704 is received by an IO receiving director 706, which could be any director in cluster 1001. For purposes of explanation the IO receiving director 706, local meta-directory owning director and local directory owning director are assumed to be different directors, although this may not always be true in practice. IO receiving director 706 responds to the write IO request 704 by sending a write local message (with data) 707 to the local meta-directory owner 4031. The local meta-directory owner responds by imposing ordering for local overlaps, if any, at 708. For purposes of explanation it is assumed that there are no local overlaps in cluster 1001 and thus no local IO ordering operations. In what will be determined to be a high priority write 710, host 1122 sends a write IO request 712 (with data) to cluster 1002. The IO request 712 is received by an IO receiving director 714, which could be any director in cluster 1002. For purposes of explanation the IO receiving director 714, remote meta-directory owner 4032 and local directory owner 4012 are assumed to be different directors, although this may not always be true in practice. IO receiving director 714 responds to the write IO request 712 by sending a write local message (with data) 716 to the remote meta-directory owner 4032. The remote meta-directory owner responds by imposing ordering for local overlaps, if any, at 718. For purposes of explanation it is assumed that there are no local overlaps in cluster 1002 and thus no local IO ordering operations. The write IO requests need not be received contemporaneously to be considered as overlapping.

The overlapping IO write requests 700 prompt nested sets of parallel procedures. A low priority write set 722 of procedures is executed in parallel with a high priority write set 724 of procedures. Within the low priority write set 722 of procedures, a metro write (with data) 726 and invalidation operations 728 are executed in parallel. The invalidation operations includes a speculative lock and invalidation message 730 which is sent from the local meta-directory owner to the local directory owner. The invalidation procedure may result in further messages which prompt older versions of the data to be removed from cache. When the locks are granted and the invalidation is complete a speculative lock ready message 732 is sent from the local directory owner to the local meta-directory owner. In response, the local meta-directory owner sends an invalidation done message 734 to the remote meta-directory owner. The remote meta-directory owner does not act on that message 734 however because of the existence of the overlapping high write. Within the high priority write set 724 of procedures, a write (with data) 736 is sent from the remote meta-directory owner to the local meta-directory owner in parallel with invalidation procedures 738. The invalidation procedures include sending a speculative lock and invalidation message 740 from the remote meta-directory owner to the remote directory owner. When the locks are granted and the invalidation completed a speculative lock ready message 742 is sent from the remote directory owner to the remote meta-directory owner. An invalidation done message 746 is then sent from the remote meta-directory owner to the local meta-directory owner.

Following the parallel procedures described above, both clusters recognize that there are overlapping write requests. A prioritization procedure is used to determine which is the higher priority write and which is the lower priority write. A variety of techniques could be used. In general the technique employed need only be predictable and consistent as between the clusters so that the same determination is made in each cluster independently. For context and without limitation, the write with the highest start LBA (logical block address)/page is the higher priority write. If two concurrent writes have the same starting LBA/page, then the write originating from the director with the highest uuid (universally unique identifier) is the higher priority write. However the prioritization could be workload dependent, e.g. based on relative IO size. In parallel, the local meta-directory owner puts the low write in a wait state at 748 while the remote meta-directory owner also puts the low write in a wait state at 750.

Referring now to FIG. 8, a lock steal message 800 is sent form the local meta-directory owner to the local directory owner in order to prepare for the high write. Locks held by the low write are released. More particularly, the low write locks are released to the high write where pages overlap, and released in general where pages do not overlap. The local directory owner signals a lock steal complete message 802 back to the local meta-directory owner when the lock steal is completed. An invalidation done message 804 is then sent from the local meta-directory owner to the remote meta-directory owner. Sets 806, 808 of procedures are then executed in parallel. Set 806 includes sending a speculative lock and invalidation done message 810 from the remote meta-directory owner to the remote directory owner. The remote meta-directory owner also performs a SCSI write 812 to the remote side DR1 and data discard at 814. The remote directory owner releases the locks 816 at some point in time. Set 808 includes sending a speculative lock and invalidation done message 818 from the local meta-directory owner to the local directory owner. The local meta-directory owner also performs a SCSI write 820 to the local side DR1 and a write done message 821 is sent from the local meta-directory owner to the remote meta-directory owner. The local meta-directory owner performs a data discard at 822. At some point in time the local directory owner unlocks the data locations at 824. An eviction notice 826 may be sent t0 the local directory owner, e.g., to prepare for a change of local directory ownership. A write done message 828 is then sent from the remote meta-directory owner to the remote IO receiving director and a write acknowledge message 830 is sent to the host.

Referring now to FIG. 9, the low write is resumed after the high write has completed with parallel sets 900, 902 of procedures. In local set 900 a write wake 904 prompts resumption of the low write. A speculative lock and invalidation message 906 is sent from the local meta-directory owner to the local directory owner. When the invalidations are completed and the locks obtained a speculative lock and invalidation ready message 908 is sent from the local directory owner to the local meta-directory owner. An inter-cluster invalidation done message 910 is then sent from the local meta-directory owner to the remote meta-directory owner. This is a necessary resend because the earlier message was ignored based on the recognition of the overlap. In remote set 902 a write wake 912 prompts resumption of the low write. A speculative lock and invalidation message 914 is sent from the remote meta-directory owner to the remote directory owner. When the invalidations are completed and the locks obtained a speculative lock and invalidation ready message 916 is sent form the remote directory owner to the remote meta-directory owner. An inter-cluster invalidation done message 918 is then sent form the remote meta-directory owner to the local meta-directory owner.

In another parallel set of procedures 920, 934, on the remote side 920 a speculative lock and invalidation done message 922 is sent from the remote meta-directory owner to the remote directory owner. A SCSI write 924 to the remote side DR1 is performed and a write done 926 is sent to the local meta-directory owner. At some point the remote directory releases the lock at 928. Further, a data discard 930 and eviction notice 932 may optionally occur. On the local side 934, a speculative lock and invalidation done message 936 is sent from the local meta-directory owner to the local directory owner. A SCSI write 938 to the local side DR1 is performed and a write done 940 is sent to the IO receiving director. The IO receiving director sends a write acknowledgement 942 to the host. At some point the local directory releases the lock as indicated at 944. Further, a data discard 946 may optionally occur.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
 a first cluster comprising:
  a first set of non-volatile back-end storage devices;
  a plurality of first computing nodes which present a logical storage device and manage access to the first set of non-volatile back-end storage devices; and
  a first local directory associated with the logical storage device, the first local directory indicating locations of data stored in cache of the first computing nodes;
 wherein the first cluster is configured to operate as part of a storage system comprising a second cluster comprising a plurality of second computing nodes which present the logical storage device and manage access to a second set of non-volatile back-end storage devices, and a second local directory associated with the logical storage device, the second local directory indicating locations of data stored in cache of the second computing nodes.

2. The apparatus of claim 1 wherein the first local directory is hosted by one of the first computing nodes.

3. The apparatus of claim 1 wherein the first local directory is distributed across multiple ones of the first computing nodes.

4. The apparatus of claim 3 comprising a first local meta-directory hosted by one of the first computing nodes, the first local meta-directory indicating which local directory is associated with each extent of data of the logical storage device.

5. A data storage system comprising:
 a first cluster comprising a plurality of first computing nodes which present a logical storage device and manage access to a first set of non-volatile back-end storage devices, and a first local directory associated with the logical storage device, the first local directory indicating locations of data stored in cache of the first computing nodes; and
 a second cluster comprising a plurality of second computing nodes which present the logical storage device and manage access to a second set of non-volatile back-end storage devices, and a second local directory associated with the logical storage device, the second local directory indicating locations of data stored in cache of the second computing nodes;
 wherein the first cluster is in communication with the second cluster via a network.

6. The data storage system of claim 5 wherein the first local directory is hosted by one of the first computing nodes and the second local directory is hosted by one of the second computing nodes.

7. The data storage system of claim 5 wherein the first local directory is distributed across multiple ones of the first computing nodes and the second local directory is distributed across multiple ones of the second computing nodes.

8. The data storage system of claim 7 further comprising a first local meta-directory hosted by one of the first computing nodes and a second local meta-directory hosted by one of the second computing nodes, the first and second local meta-directories indicating which of the first and second computing nodes, respectively, host portions of the local directory associated with each extent of data of the logical storage device.

9. The data storage system of claim 8 wherein, in response to a read request, a receiving computing node of the plurality of first computing nodes is configured to prompt the computing node which hosts the first local meta-directory to identify at least one of the computing nodes that hosts the first local directory for data associated with the read request.

10. The data storage system of claim 9 wherein the receiving computing node obtains a location of the data from the at least one of the computing nodes that hosts the first local directory for data associated with the read request, and uses that location to obtain a copy of the data.

11. The data storage system of claim 8 wherein, in response to a write request, a receiving computing node of the plurality of first computing nodes is configured to prompt the computing node which hosts the first local meta-directory to contact at least one of the computing nodes that hosts the first local directory for data associated with the write request to obtain locks and maintain cache coherency.

12. The data storage system of claim 11 wherein the computing node which hosts the first local meta-directory contacts the computing node which hosts the second local meta-directory to prompt the computing node which hosts the second local meta-directory to contact at least one of the computing nodes that hosts the second local directory for data associated with the write request to obtain locks and maintain cache coherency.

13. The data storage system of claim 12 wherein, in response to an overlapping write request, the computing node which hosts the first local meta-directory and the computing node which hosts the second local meta-directory independently determine priority of the write request relative to the overlapping write request and execute the write requests in order as determined by priority.

14. The data storage system of claim 13 wherein a lock obtained for a lower priority write is released to an overlapping higher priority write.

15. A method comprising:
in a first cluster comprising a plurality of first computing nodes:
presenting a logical storage device backed by a first set of non-volatile back-end storage devices;
maintaining a first local directory associated with the logical storage device, the first local directory being distributed across multiple ones of the first computing nodes and indicating locations of data stored in cache of the first computing nodes; and
maintaining a first local meta-directory hosted by one of the first computing nodes, the first local meta-directory indicating which first computing nodes host portions of the local directory associated with each extent of data of the logical storage device; and
in a second cluster comprising a plurality of second computing nodes:
presenting the logical storage device backed by a second set of non-volatile back-end storage devices;
maintaining a second local directory associated with the logical storage device, the second local directory being distributed across multiple ones of the second computing nodes and indicating locations of data stored in cache of the second computing nodes; and
maintaining a second local meta-directory hosted by one of the second computing nodes, the second local meta-directory indicating which second computing nodes host portions of the local directory associated with each extent of data of the logical storage device.

16. The method of claim 15 comprising, in response to a read request, a receiving computing node of the plurality of first computing nodes prompting the computing node which hosts the first local meta-directory to identify at least one of the computing nodes that hosts the first local directory for data associated with the read request.

17. The method of claim 16 comprising the receiving computing node obtaining a location of the data from the at least one of the computing nodes that hosts the first local directory for data associated with the read request, and using that location to obtain a copy of the data.

18. The method of claim 15 comprising, in response to a write request, a receiving computing node of the plurality of first computing nodes prompting the computing node which hosts the first local meta-directory to contact at least one of the computing nodes that hosts the first local directory for data associated with the write request to obtain locks and maintain cache coherency.

19. The method of claim 18 comprising the computing node which hosts the first local meta-directory contacting the computing node which hosts the second local meta-directory to prompt the computing node which hosts the second local meta-directory to contact at least one of the computing nodes that hosts the second local directory for data associated with the write request to obtain locks and maintain cache coherency.

20. The method of claim 19 comprising, in response to an overlapping write request, the computing node which hosts the first local meta-directory and the computing node which hosts the second local meta-directory independently determining priority of the write request relative to the overlapping write request and executing the write requests in order as determined by priority.

* * * * *